(12) United States Patent
Domejean et al.

(10) Patent No.: US 7,352,552 B2
(45) Date of Patent: Apr. 1, 2008

(54) DEVICE FOR PROTECTION AGAINST VOLTAGE SURGES WITH MOBILE ELECTRODE

(75) Inventors: Eric Domejean, Voreppe (FR); Robert Diconne, Sassenage (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 10/532,350

(22) PCT Filed: Oct. 2, 2003

(86) PCT No.: PCT/FR03/02885

§ 371 (c)(1),
(2), (4) Date: Apr. 22, 2005

(87) PCT Pub. No.: WO2004/042762

PCT Pub. Date: May 21, 2004

(65) Prior Publication Data

US 2006/0044729 A1    Mar. 2, 2006

(30) Foreign Application Priority Data

Oct. 25, 2002    (FR) .................................. 02 13378

(51) Int. Cl.
*H02H 9/06* (2006.01)
(52) U.S. Cl. .................................................... 361/118
(58) Field of Classification Search ................ 361/117, 361/2, 4, 10, 11, 12, 118, 99; 335/14, 16, 335/20

See application file for complete search history.

(56) References Cited

U.S. PATENT DOCUMENTS

| | | | | |
|---|---|---|---|---|
| 4,168,514 A | * | 9/1979 | Howell ......................... | 361/56 |
| 4,288,833 A | * | 9/1981 | Howell ........................ | 361/124 |
| 5,321,574 A | * | 6/1994 | Patrick et al. ................ | 361/99 |
| 5,493,264 A | * | 2/1996 | Menier et al. ................ | 335/14 |
| 6,930,871 B2 | * | 8/2005 | Macanda ..................... | 361/117 |

* cited by examiner

*Primary Examiner*—Michael Sherry
*Assistant Examiner*—Lucy Thomas
(74) *Attorney, Agent, or Firm*—Steptoe & Johnson LLP (57) ABSTRACT

A protection device against voltage surges, connected between an electric line and earth, comprises a first connecting electrode, a second connecting electrode and a mobile switching electrode for switching between an operating position, in contact with the first connecting electrode, and a switching position, close to the second connecting electrode. An electric dipole, comprising for example a variable resistor and/or a spark arrester, connects the mobile electrode to the second connecting electrode. The mobile electrode can be moved by a mechanism, an electromechanical relay and/or a magnetic circuit performing repulsion when the current intensity becomes very high. Separation of the electrodes produces an arc which limits the current flowing in the dipole then, by switching on the second connecting electrode, performs disconnection of the dipole from the circuit thus ensuring protection thereof.

14 Claims, 7 Drawing Sheets

DEVICE FOR PROTECTION AGAINST VOLTAGE SURGES WITH MOBILE ELECTRODE

BACKGROUND OF THE INVENTION

The invention relates to a device designed to divert an electric current wave to earth when the voltage of a line exceeds a given threshold.

STATE OF THE PRIOR ART

In the document DE 32 28 471 there is described a device of this type formed by two parallel circuit branches arranged between an input terminal connected to a line and an output terminal connected to earth. One of the branches comprises a spark arrester, the other branch comprising a variable resistor. It is known that the spark arrester has a higher response time than the variable resistor. When a small voltage surge characteristic of a lightning flash situated a long distance from the device occurs between the terminals, the variable resistor is turned on in a few nanoseconds and the current flows without the spark arrester being put into operation, as the ignition voltage of the spark arrester is never reached. When a large voltage surge characteristic of a lightning flash in immediate proximity to the device occurs between the terminals, the variable resistor reacts first but the voltage at the terminals of the spark arrester is sufficient for the spark arrester to be turned on, which enables the current subsequently flowing in the variable resistor to be limited. However, the branch of the circuit comprising the variable resistor remains turned on when the spark arrester comes into operation. The variable resistor is therefore not efficiently protected in case of a long follow current wave. There is therefore a risk of the variable resistor being damaged. When the variable resistor is damaged, it lets a leakage current flow in continuous manner. In addition, it is liable to no longer reach the ignition voltage of the spark arrester. It is therefore proposed to insert a means for monitoring the state of the variable resistor in the branch comprising the variable resistor, this means performing disconnection of the branch in which the variable resistor is located when the characteristics of the variable resistor are downgraded. In this case, the device continues to operate in downgraded mode, where protection is performed by the spark arrester only.

Furthermore, correct operation of the device is tributary to judicious matching of the components, guaranteeing a precise overlapping range between the field of operation of the variable resistor and that of the spark arrester. It is in fact indispensable for the variable resistor to be able to withstand voltages greater than the ignition voltage of the spark arrester, but also for the variable resistor to reach the ignition voltage of the spark arrester quickly. This imposes the use of components with low current/voltage characteristic dispersion, the characteristics whereof are relatively constant in time, resulting in a high cost price.

To overcome this second problem, it has been proposed in the document DE 38 12 058 to connect an impedance in series on the circuit branch comprising the variable resistor. The characteristics of the impedance are chosen in suitable manner so that the transition between the operating mode with the spark arrester off and the operating mode with the spark arrester on takes place in a manner that is relatively insensitive to the variations of the characteristics of the variable resistor and of the spark arrester. However, this artifice does not overcome the problem of premature ageing of the variable resistor.

In the document FR 1,052,741 there is further described an arc transfer lightning arrester comprising two metallic power electrodes situated at a distance from one another, and an intermediate electrode formed by a semi-conducting resistor connected in series with one of the metallic electrodes and salient towards the other metallic electrode. In the event of a voltage surge, a discharge arc first ignites at the end of the resistive electrode and then migrates to ignite between the two metallic electrodes. The resistive electrode of such a lightning arrester is kept in series for discharges of small amplitude and of short duration and is short-circuited for discharges of large amplitude or of long duration. A certain protection of the resistive electrode is thus achieved. This is at least what is asserted in the document. In fact, under certain conditions of use, the arc can double up or have an oscillation behavior between the resistive electrode and the power electrode whereto it is connected. In addition, it appears difficult to define with precision the ignition voltage of the device, which will be tributary to the state of the surface of the resistive electrode and of the metallic electrode facing the latter, to the characteristics of the resistive electrode and to all the parameters characteristic of the breakdown voltage in the gas in which the electrodes are immersed, i.e. as a first approximation the distance between the resistive electrode and the electrode facing the latter and the gas pressure, but also the form of the electrodes and the characteristics of the gaseous medium, permeability, humidity, temperature or pressure.

SUMMARY OF THE INVENTION

The object of the invention is therefore to propose a protection device against voltage surges that does not have the drawbacks set out above. More precisely, its object is to propose a protection device against voltage surges that comprises a non-linear electric dipole, or electrical ignition means, in particular with a variable resistor, designed to respond quickly to the voltage surges occurring at the terminals of the device, and means to divert very high currents directly to earth without flowing via the dipole.

For this purpose, the object of the invention is to provide a protection device against voltage surges, comprising:
- a first connecting electrode in electrical connection with a first connecting pad,
- a second connecting electrode in electrical connection with a second connecting pad,
- a third mobile arc switching electrode electrically connected to the second connecting pad,
- an arc chute opening out onto the first and second connecting electrodes,
- means for driving the mobile electrode with respect to the first connecting electrode from an operating position to a switching position moving away from the first connecting electrode and moving towards the second connecting electrode, so that an electric arc drawn between the first connecting electrode and the mobile electrode switches between the first connecting electrode and the second connecting electrode when the mobile electrode moves from the operating position to the switching position.

An electric dipole, or electrical ignition means, connected in such a way that when the mobile electrode is in the operating position, the electric dipole is connected to the arc switching electrode on the one hand and to the first or second connecting pads on the other hand, and that when the mobile electrode is in the switching position and an electric arc is drawn between the first connecting electrode and the second connecting electrode, the electric dipole is disconnected from the circuit, the electric dipole having an ohmic resistance varying non linearly with the voltage applied to the dipole, the ohmic resistance being high when the voltage is lower than an ignition voltage and decreasing when the voltage increases above the ignition voltage.

By moving the switching electrode to the switching position, an electric arc is first created between the mobile electrode and the first connecting electrode, which has the immediate effect of limiting the current flowing in the dipole. When the switching electrode approaches the switching position, the electric arc switches between the connecting electrodes, thus switching the electric dipole out of the circuit. Double protection of the dipole is thus achieved.

Preferably, the electric dipole is connected in series between the switching electrode and the second connecting pad. The device obtained is then particularly simple. It is in particular possible to provide for the mobile electrode in the operating position to be in contact with the first connecting electrode.

According to an alternative embodiment, the electric dipole, or electrical ignition means, is connected in series between the first connecting electrode and a fixed fourth electrode situated at a distance from the first connecting electrode and in such a way that the mobile electrode in the operating position is electrically connected to the fixed fourth electrode.

Preferably, the device in addition comprises electromagnetic induction projection means to induce electromagnetic forces on an electric arc formed between the first connecting electrode and the mobile electrode tending to project the arc to the arc chute and/or tending to make the arc switch on the second connecting electrode. The electro-magnetic induction projection means have the function of causing elongation of the arc, fostering limiting of the follow current and/or of fostering switching of the arc between the connecting electrodes. Naturally, the forces acting on the electric arc increase with the intensity of the arcing current, which is favorable for good current limiting.

The movement of the switching electrode is not necessarily of large amplitude and can be achieved by any suitable means. Preferably, the driving means comprise electromagnetic induction repulsion means to induce electromagnetic forces on the mobile electrode through which a current is flowing tending to drive the mobile electrode to the switching position. Electromagnetic induction repulsion means have the advantage, in comparison with purely mechanical driving means, of being very fast. In practice, the electromagnetic induction repulsion and projection means will be the same: they will for example be in the form of a loop given to the first connecting electrode.

According to a particularly advantageous embodiment, the electromagnetic induction repulsion means comprise a magnetic driving circuit to channel a magnetic flux generated by an electric current flowing between the first connecting pad and the first connecting electrode to the mobile electrode in the operating position, so that when an electric current flows from the first connecting pad to the mobile electrode, electro-magnetic forces are induced in the mobile electrode, tending to drive the mobile electrode to the switching position. In this case as well, the magnetic circuit will be able to cumulate a function of arc projection means and a function of driving the mobile electrode.

The driving means can comprise, possibly in combination, in particular:
an electromechanical relay sensitive to the current flowing in the first connecting electrode or the mobile electrode;
a mechanism equipped with a mobile means for operation between an operating position and a disconnection position and a kinematic link between the means for operation and the mobile electrode to drive the mobile electrode to a disconnected position when the means for operation move from the operating position to the disconnection position;
flexible return means for returning the mobile electrode to the operating position;
an energy storage spring, discharging when driving the mobile electrode from the operating position to the switching position.

Advantageously, the electric dipole, or electrical ignition means, comprises a variable resistor.

Alternatively, it can be provided for the electric dipole, or electrical ignition means, to comprise a spark arrester. It can also be provided for the electric dipole to comprise a spark arrester and/or an impedance connected in series between a variable resistor on the one hand and the second connecting pad or the mobile electrode on the other hand.

BRIEF DESCRIPTION OF THE DRAWINGS

Other advantages and features will become more clearly apparent from the following description of particular embodiments of the invention, given as non restrictive examples only and represented in the accompanying drawings in which.

DETAILED DESCRIPTION OF AN EMBODIMENT

Figure 1:
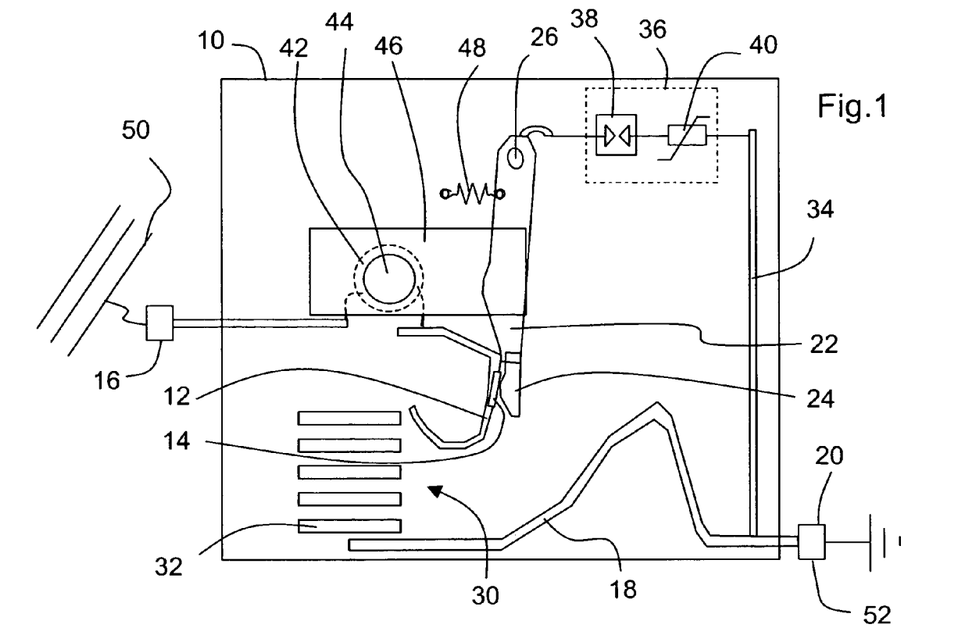
FIGS. 1 and 2 represent a protection device according to a first embodiment of the invention, respectively in the operating position and in the switching position.
Figure 2:
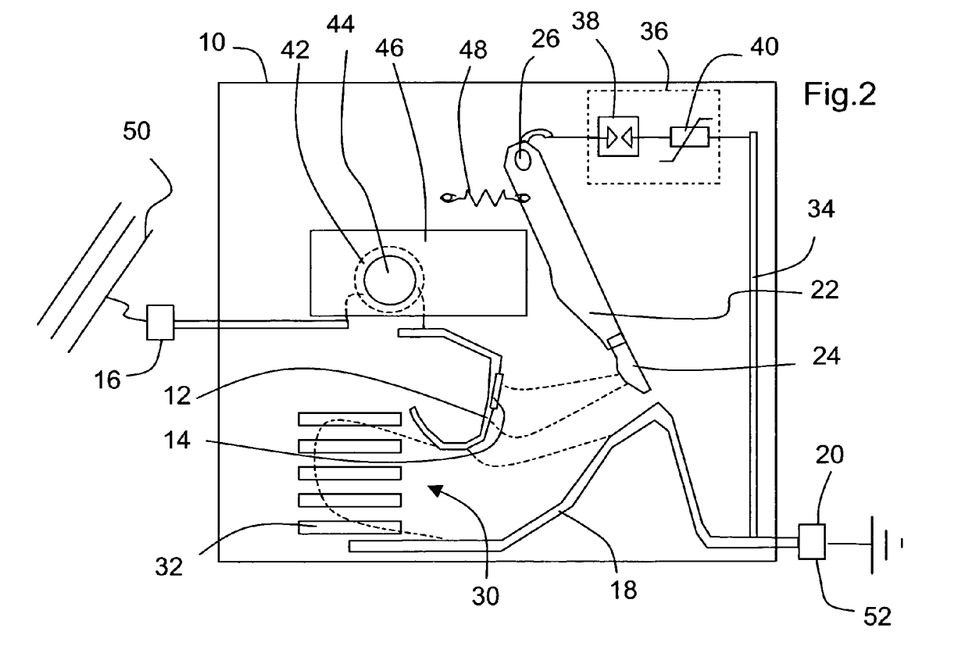

In FIGS. 1 and 2 a protection device against voltage surges according to a first embodiment of the invention is represented. Inside a molded case 10 made of insulating synthetic material there are arranged a first connecting electrode 12 provided with a fixed contact 14 and connected to a first connecting pad 16, a second connecting electrode 18 connected to a second connecting pad 20, and a mobile transfer electrode 22 provided with a mobile contact 24, pivoting around a fixed axis 26 from an operating position represented in FIG. 1, ensuring contact between the two contacts 14, 24, to a switching position represented in FIG. 2, in which position the mobile electrode 22 is close to the second connecting electrode 18. The two connecting electrodes 12, 18 are located at a distance from one another, and bound the inlet of an arc chute 30 equipped with deionizing fins 32.

The second connecting pad 20 is also connected to the mobile electrode 22 by means of a circuit branch 34 containing an electric ignition dipole, or electrical ignition means, 36 formed by a variable resistor 40 and a spark arrester 38 connected in series. This dipole 36 is characterized by an ignition voltage below which the current flowing in the dipole is zero (infinite ohmic resistance) and above which the dipole is turned on, with a low ohmic resistance. The presence of the spark arrester 38 prevents leakage current if the variable resistor 36 is damaged. The variable resistor 36, gives the dipole a suitable voltage-current curve, with the ohmic resistance decreasing progressively as the voltage increases.

An inductance coil 42 (half-turn or winding) is connected in series between the first connecting pad 16 and the connecting electrode 12. This inductance coil 42 is wound around a core 44 forming the base of a U-shaped magnetic circuit 46 the lateral branches whereof surround the mobile electrode 22, ensuring electromagnetic coupling. A return spring 48 of weak stiffness biases the mobile electrode 22 clockwise in FIG. 1, towards the fixed electrode 12.

For the sake of clarity, the first connecting pad 16 has been represented connected to an electric line 50 and the second connecting pad 20 connected to earth 52, although the opposite arrangement can also be envisaged as can other more complex layouts known to those specialized in protection devices against voltage surges.

The device operates in the following manner.

In the absence of a voltage surge on the line, the potential difference between the two connecting pads 16, 20 is lower than the ignition voltage defined by the ignition dipole, or electrical ignition means 36. The device is not turned on.

When a voltage surge exceeding the ignition voltage occurs, the ignition dipole 36 is turned on and a current starts flowing from the line 50 to earth 52, flowing via the first pad 16, inductance coil 42, fixed contact 14, mobile contact 24, mobile electrode 22, ignition dipole 36 and second pad 20. The subsequent stages of the protection sequence depend on the intensity of the current flowing through the contacts.

If the current intensity is not very high, the induced electromagnetic field is insufficient to compensate the contact pressure defined by the return spring 48 and causes the mobile contact 24 to be raised. As soon as the current wave has passed, the potential difference at the terminals of the ignition dipole, or electrical ignition means, 36 drops back below the ignition voltage and the ignition dipole is turned off again. The follow current is therefore interrupted by the ignition dipole 36.

If the current intensity is higher, the electromagnetic field induced by the current flowing through the inductance coil 42 is sufficient to compensate the contact pressure defined by the return spring 48 and to project the mobile electrode 22 to the switching position represented in FIG. 2. An electric arc (in fine mixed lines in FIG. 2) is formed between the contacts 14, 24 as soon as separation of the latter takes place, and the switched arc foot moves at high speed onto the first electrode 12. The current intensity may not be sufficiently great to project the arc into the chute, but in this case electro-magnetic repulsion at least prevents the mobile electrode from dropping back down. The current is then interrupted by the ignition dipole, in series with the arc drawn between the contacts. If the current is very high, the magnetic field induced by the loop effect due to the shape of the first electrode, and by the magnetic circuit concentrating the field induced by the inductance coil 42 close to the mobile electrode 22, quickly becomes very high, and the arc is propelled towards the arc chute 30. The mobile electrode 22, when moving from its separated position, moves towards the second electrode 18 and thus enables the arc to switch onto the second electrode 18. At this moment, the current which was up to then flowing via the branch 34 of electric circuit containing the ignition dipole, or electrical ignition means 36, also switches onto the branch formed by the first electrode 12, the electric arc, the second electrode 18 and the second connecting pad 20. This switching disconnects the ignition dipole 36 from the circuit and enables it to be preserved.

When the device is subjected to an even higher current wave, of the direct lightning current type, followed by a follow current, a first arc forms almost instantaneously between the contacts 14, 24 and is projected violently by electromagnetic loop effect to the back of the arc chute 30, even before the mobile electrode 22 has reached its separation position, close to the second electrode. In a second stage, a follow current occurs, corresponding to a second arc whose behavior is comparable to that described in the foregoing paragraphs. This second arc is extinguished under the conditions described in the previous paragraph.

In all the cases where the current is sufficiently high to lift the mobile electrode 22, electromagnetic repulsion prevents the mobile electrode 22 from falling back down until the current is cancelled in the mobile electrode. The weight of the mobile electrode 22 and the stiffness of the return spring 48 are chosen according to the threshold above which it is desired to limit the current in the electric dipole, or electrical ignition means 36, but also to ensure that the mobile electrode does not fall onto the first connecting electrode before the arc between the connecting electrodes has been extinguished. In practice, an electrode 22 of very low inertia and a spring of weak stiffness are therefore chosen.

Figure 3:
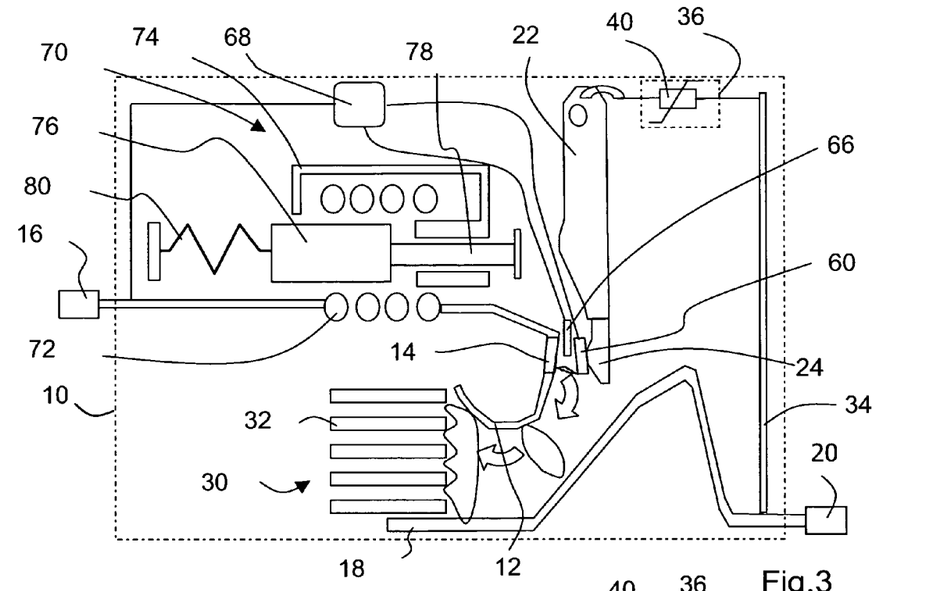
FIGS. 3 and 4 represent a protection device according to a second embodiment of the invention, respectively in the operating position and in the switching position.
Figure 4:
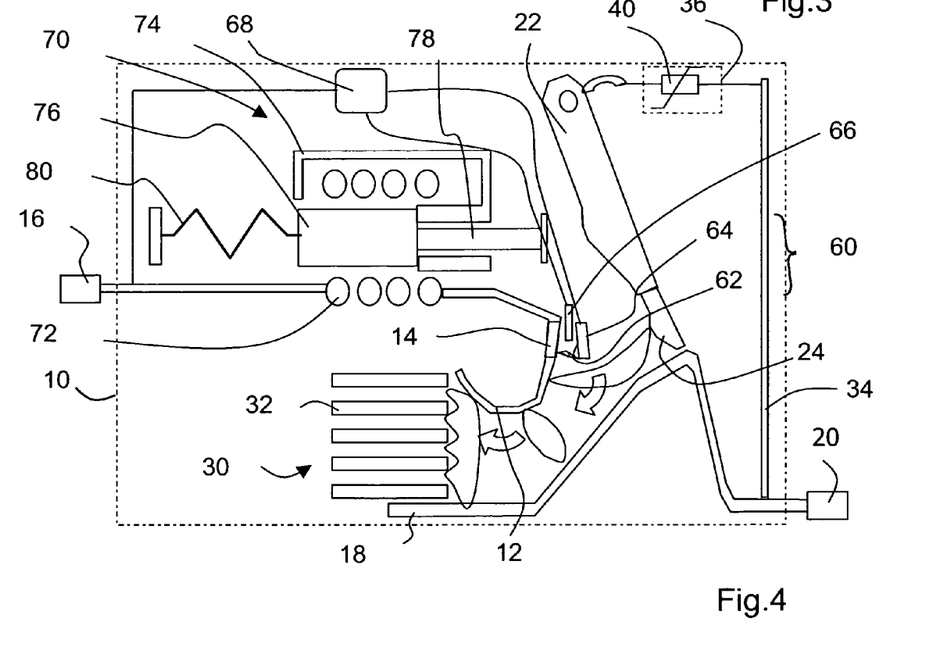

A protection device according to a second embodiment of the invention is illustrated in FIGS. 3 and 4. This device is constituted in similar manner to the first embodiment, so that the same reference signs have been taken to designate identical or similar elements. This device comprises, housed in a case 10 made of insulating material, a first connecting electrode 12 connected to a first connecting pad 16, a second connecting electrode 18 connected to a second connecting pad 20, a mobile electrode 22 pivoting around a fixed axis 26, and a fixed conducting stud 60 presenting a face 62 constituting a fixed electrode (FIG. 4) facing the first connecting electrode 12 and an opposite face 64 constituting a contact electrode whereon the mobile electrode rests. The electrodes are arranged facing an arc chute 30 equipped with cooling fins 32. The two connecting electrodes 12, 18 are facing one another at the inlet of the arc chute 30.

Between the first connecting electrode 12 and stud 60 there is arranged an ignition electrode 66, controlled by an ignition circuit 68 detecting a potential difference between the first connecting pad 16 and the stud 60. An electromechanical relay 70 is arranged facing the pivoting arm. The relay 70 comprises a coil 72 connected in series between the connecting pad 16 and the fixed electrode 62, a yoke 74 forming a magnetic circuit, a mobile armature 76 extended by a striker 78, and a return spring 80 to return the mobile armature 76 to a rest position, to the left of FIGS. 1 and 4.

The mobile electrode 22 is electrically connected to the second connecting pad 20 and to the second connecting electrode 18 by means of an electric circuit branch 34 comprising an electric dipole, or electrical ignition means, 36 formed by a variable resistor 40.

In operation, one of the connecting pads is connected to an electric line 50 and the to earth 52. In operation, the device is not on, as the first connecting electrode 12 is located at a distance from the electrode 62 of the stud 60. If the potential difference between the fixed electrode and the pad exceeds a threshold set by the ignition circuit 68 and higher than the ignition voltage of the variable resistor 40, the voltage of the ignition electrode 66 is increased by the ignition circuit 68 to a level such that an arc is triggered between the ignition electrode 66 and one of the electrodes 12, 62. This arc is immediately established between the connecting electrode 12 and stud 60, and the electric current finds a path between the connecting pads 16, 20, flowing via the connecting electrode 12, the arc, the stud 60, the mobile electrode 22 in the rest position and the variable resistor 40 that has been turned on. The loop shape of the electrode 12 induces electromagnetic forces on the arc propelling the latter towards the arc chute 30. The arc thereby switches directly on the second connecting electrode and penetrates into the arc chute where it is extinguished at the end of the current wave. Extinction of the arc opens the circuit and the line is isolated from the earth. The total lifetime of the arc, a few tens of microseconds, is sufficiently small for the relay not to operate, due to its inertia.

Under certain circumstances however, an electric arc may persist between the first connecting electrode 12 and the stud 60, either due to a follow current or due to degrading of the electrodes over time. In such a case, the electromechanical relay 70 is supplied for a sufficiently long time to move the mobile assembly 76 the end 78 whereof strikes the mobile electrode 22 and projects it to the switching position, as represented in FIG. 4. The arc then switches between the connecting electrode 12 and the mobile electrode 22 then between the two connecting electrodes 12, 18, and is elongated until it enters the arc chute. From the time the arc has switched between the two connecting electrodes 12, 18, the circuit branch comprising the variable resistor 40 is switched out of the circuit, ensuring protection of the variable resistor 40. The arc is then free to penetrate completely into the arc chute 30 where it encounters the deionizing fins 32 which cool the arc and cause extinction thereof. A latch can be provided to prevent the mobile electrode 22 from falling back. A resetting mechanism can be provided to enable the mobile electrode 22 and/or relay 70 to be returned to the operating position.

Figure 5:
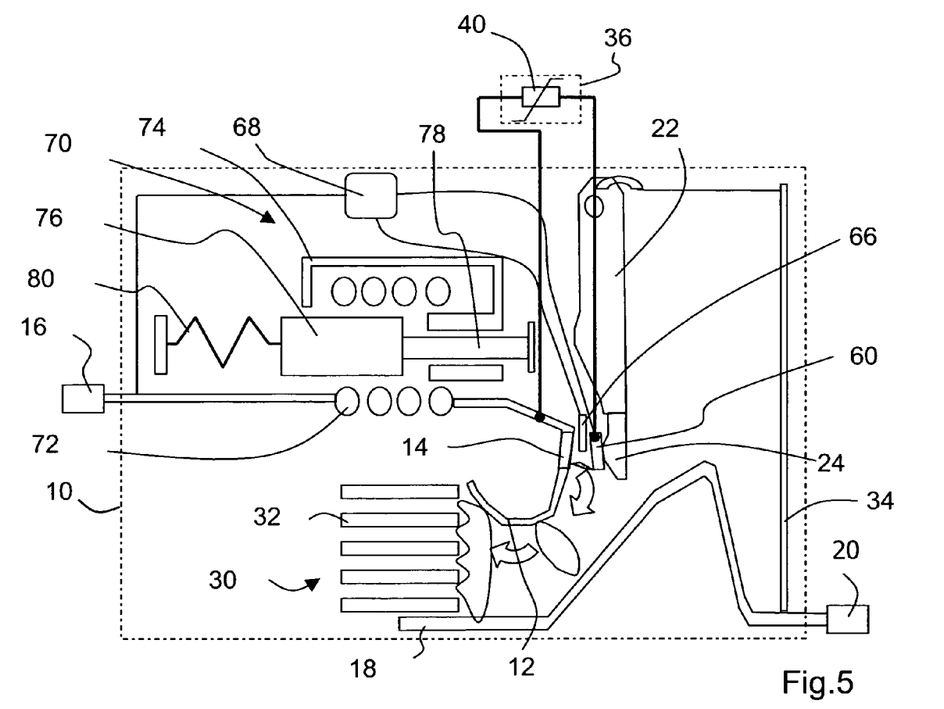
FIG. 5 represents a protection device according to a third embodiment of the invention, in an operating position.

In FIG. 5 a device according to a third embodiment of the invention has been represented, which only differs from the device according to the second embodiment by the specific connection of the dipole, or electrical ignition means 36, between the first connecting electrode 12 and the stud 60. In this case, the variable resistor 40 of the dipole 36 is connected in parallel with the spark arrester formed by the first connecting electrode 12, the fixed stud 60 and the ignition electrode 66, so that the ignition voltage is controlled by the dipole 36 only, whereas in the second embodiment the voltage was defined by the dipole in series with the spark arrester. In this embodiment as well, the dipole 36 is switched out of the circuit when the electric arc has switched between the connecting electrodes 12, 18.

A protection device according to a fourth embodiment of the invention has been represented in FIGS. 6 to 9. This device is of similar constitution to that of the first embodiment, so that the same reference signs have been taken to designate identical or similar elements. Like the device according to the first embodiment, it comprises a first connecting electrode 12 provided with a fixed contact 14 and connected to a first connecting pad 16, a second connecting electrode 18 connected to a second connecting pad 20, and a mobile electrode 22. The first connecting electrode 12 is U-shaped to foster an electromagnetic repulsion effect on the mobile electrode 22. To set the idea out clearly, the first connecting pad 16 has been connected to a line 50 and the second connecting pad has been connected to the earth 52.

Figure 6:
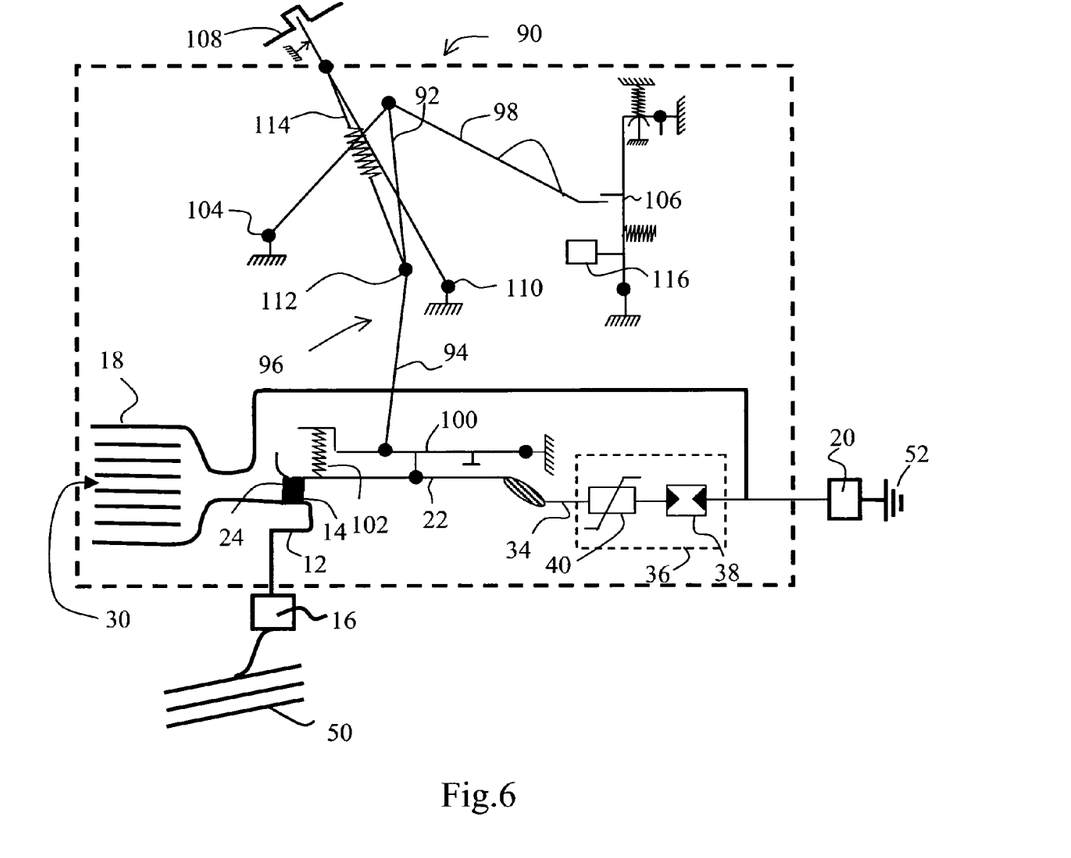
FIGS. 6, 7, 8 and 9 represent a protection device according to a fourth embodiment of the invention, respectively in the operating position, in the disconnection position, in a first switching position and in a second switching position.

The mobile electrode 22 is provided with a contact 24 operating, in the operating position represented in FIG. 6, in conjunction with the fixed contact 14. The two connecting electrodes 12, 18 are situated at a distance from one another, and bound the inlet of an arc chute 30 equipped with deionizing fins 32. The second connecting pad 20 is also connected to the mobile electrode 22 by means of a circuit branch 34 whereon there is connected in series an electric ignition dipole, or electrical ignition means, 36 comprising a variable resistor 40 and a spark arrester 38 connected in series.

The device according to the fourth embodiment differs from the previous embodiments essentially by the fact that it is provided with an opening mechanism 90 of the type that is usually to be found in circuit breakers. Such a mechanism comprises an upper rod 92 and a lower rod 94 forming a toggle joint 96 connecting a catch 98 to an electrode support bar 100, supporting the mobile electrode 22 by means of a contact pressure spring 102. The catch 98 pivots around a fixed axis 104 and is retained by a latch 106 in a latching position. A handle 108 pivoting around a fixed geometric axis 110 is connected to the swivel-pin 112 of the toggle 96 by means of an energy storage spring 114. An electromechanical relay 116 controls the position of the latch according to electrical parameters such as the intensity of the current flowing in the electric dipole 36 as a function of time. In the closed position of the mechanism, in FIG. 6, the catch 98 is in the latched position and the mobile electrode 22 is in the operating position, in contact with the first connecting electrode 12. It is then possible to open the apparatus by performing a rocking movement of the handle 108 to the right in the figure, which drives the electrode support 100 by means of the toggle 96 which folds. In the open position of the mechanism (FIG. 7), the mobile electrode 22 is located close to the second connecting electrode 18. Inversely, it is possible to reclose the mechanism by again performing a rocking movement of the handle 108 which unfolds the toggle 96 and moves the electrode support 100 and the mobile electrode 22 to the operating position. From the closed position, it is also possible to move the electrode support 100 at high speed without operating the handle 108, by actuating the latch 106 which releases the catch 98. The residual charge of the energy storage spring 114 in the closed position is then sufficient to move the electrode support 100 and the mobile electrode 22 to a switching position represented in FIG. 9, close to the second connecting electrode 18, the mechanism then being in a tripped position.

Figure 8:
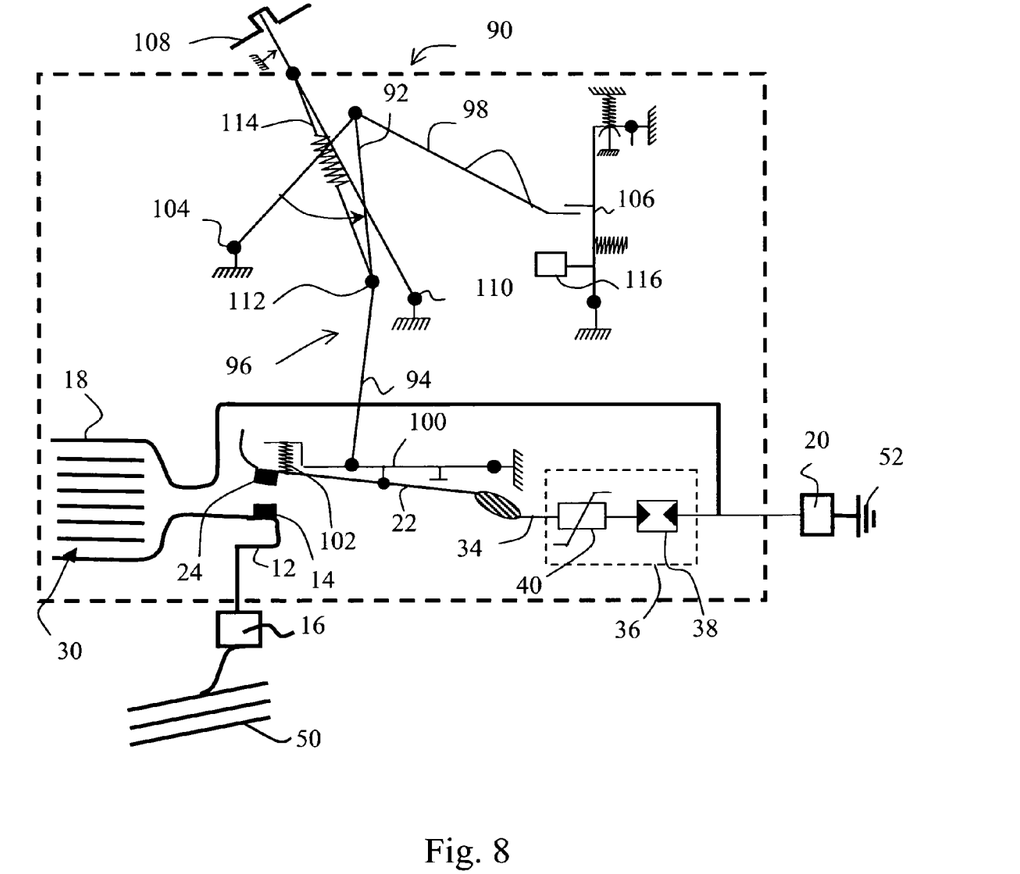
Figure 9:
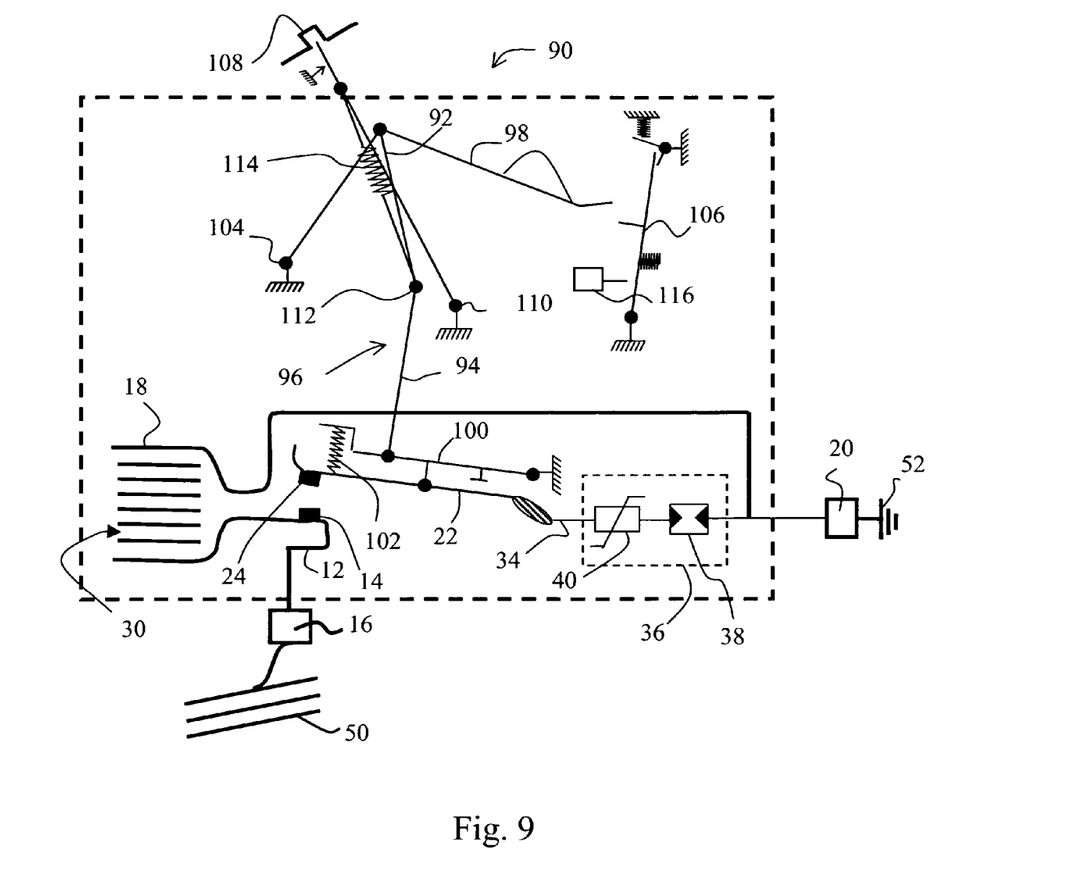

Operation of the device according to the fourth embodiment is similar to that of the first embodiment. In case of a large difference of potential between the two connecting electrodes 12, 18, exceeding the ignition voltage of the dipole, or electrical ignition means 36, the dipole 36 turns on enabling the current to flow to earth. If the current intensity is high, the electromagnetic repulsion forces induced on the mobile electrode 22 are sufficient to lift the electrode 22 by compressing the contact pressure spring 102, the electrode support 100 remaining immobile, as represented in FIG. 8. As soon as separation of the contacts takes place, an electric arc arises, which arc tends to limit the current flowing in the dipole 36. The U shape of the connecting electrode 12 also tends to foster elongation of the arc in the direction of the arc chute 30. Although the mechanism remains immobile, the slight movement of the mobile electrode 22 and the second connecting electrode 18 towards one another, combined with the intense electromagnetic field at the inlet of the arc chute 30, is sufficient for the arc to elongate curving in the arc chute, and then to switch on the second connecting electrode 18. It can therefore be considered that the repulsion position of the mobile electrode 22 is a switching position.

If, however, the current intensity remains high for a sufficiently long time, the electromechanical relay 116 actuates the latch 106 which releases the catch 98. The mechanism is moved to the tripped position represented in FIG. 9, causing pivoting of the electrode support 100 and of the mobile electrode 22 which moves the mobile electrode 22 towards the second connecting electrode 18. Switching of the arc on the second connecting electrode 18 then occurs, and the dipole 36 is disconnected from the circuit. The arc is elongated and then extinguished in the arc chute 30. The tripped position of the mechanism therefore corresponds to a second switching position of the mobile electrode 22.

Figure 7:
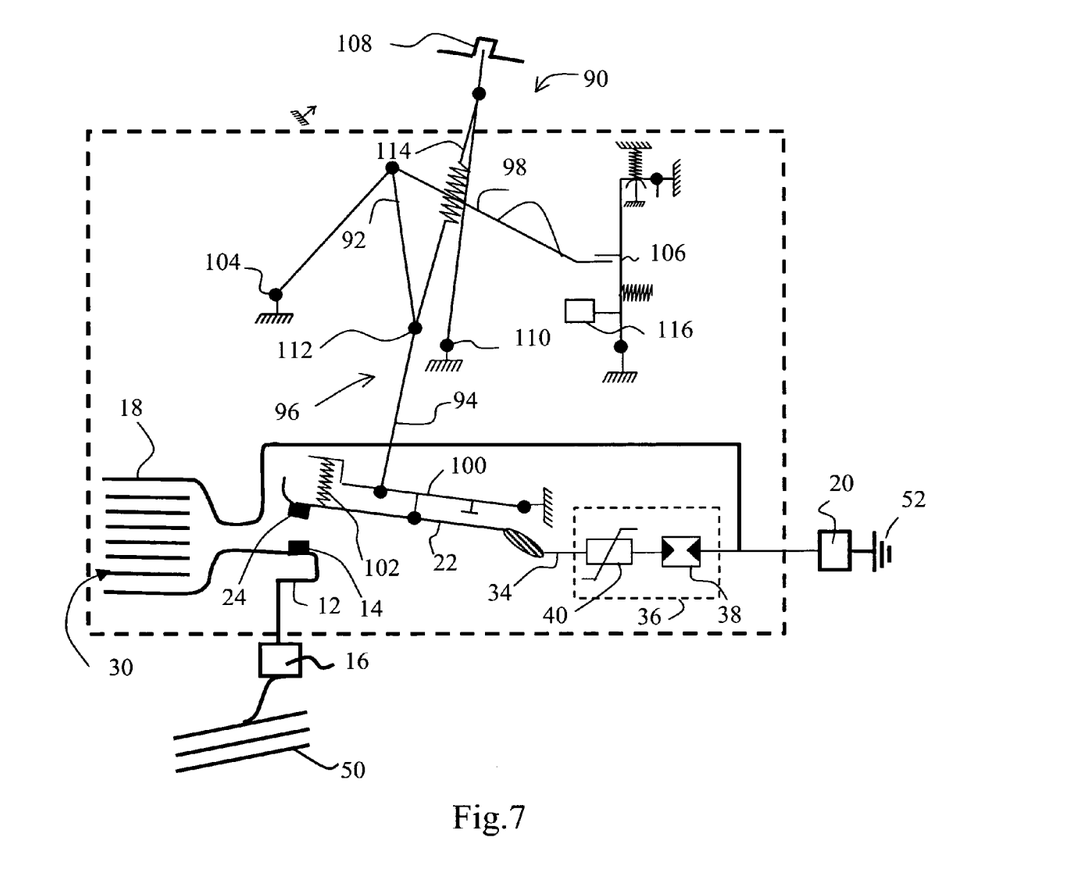

The mechanism offers additional advantages. First of all, it enables disconnection to be performed between the line and earth by actuating the handle 108 to the open position (FIG. 7). Latching of the handle 108 in the open position can moreover be provided to enable operations up-line or down-line from the device.

Furthermore, it is possible to trip the mechanism when a leakage current is detected in the branch 34 comprising the variable resistor. End of life tripping of the dipole, and appropriate visual indication, are thus obtained by characteristic positioning of the handle 108.

Various modifications are naturally possible.

The dipole can be constituted by a variable resistor alone, or by a variable resistor in series with a spark arrester or an impedance, or other elements with similar effects. In all cases, the ignition dipole has a voltage-current ignition characteristic which enables an ignition voltage to be defined below which the current flowing through the dipole is zero or very low (very high ohmic resistance), and above which the dipole is turned on, with a lower ohmic resistance. When the dipole is on and the current increases, the voltage at the terminals of the dipole must however be or become greater than the voltage of an arc drawn between the connecting electrodes.

The mechanism of the fourth embodiment of the invention is only one possibility among others, and the man of the trade will be able to choose any mechanism commonly used for circuit breakers, performing a tripping function.

The mobile electrode in the switching position can touch the second connecting electrode. A second connecting electrode can also be provided forming a U shape in a plane geometrically perpendicular to the plane of movement of the mobile electrode, the mobile electrode moving from an operating position situated on one side of the geometrical plane to a switching position situated on the other side of the geometrical plane, and passing through the geometrical plane between the two branches of the U formed by the second connecting electrode, to perform switching of the arc.

It should be emphasized that, in the figures, the switching position of the mobile electrode is represented in schematic manner, relatively far from the operating position. In practice however, it is possible to achieve arc switching with a movement of small amplitude.

The invention claimed is:

1. A device for protection against voltage surges, comprising:
    a first connecting electrode in electrical connection with a first connecting pad,
    a second connecting electrode in electrical connection with a second connecting pad,
    a third mobile arc switching electrode electrically connected to the second connecting pad,
    an arc chute opening onto the first and second connecting electrodes,
    means for driving the mobile arc switching electrode with respect to the first connecting electrode from an operating position to a switching position moving away from the first connecting electrode and moving towards the second connecting electrode, so that an electric arc drawn between the first connecting electrode and the mobile arc switching electrode switches between the first connecting electrode and the second connecting electrode when the mobile arc switching electrode moves from the operating position to the switching position,
    an electrical ignition means connected so that when the mobile arc switching electrode is in the operating position, the electrical ignition means is connected in series between the arc switching electrode and the second connecting pad, and that when the mobile arc switching electrode is in the switching position and an electric arc is drawn between the first connecting electrode and the second connecting electrode, the electrical ignition means is disconnected from the circuit, the electrical ignition means having an ohmic resistance varying inversely with the voltage applied to the electrical ignition means, the ohmic resistance being high when the voltage is lower than an ignition voltage and decreasing when the voltage increases above the ignition voltage.

2. A device according to claim 1, wherein the mobile arc switching electrode in the operating position is in contact with the first connecting electrode.

3. A device according to claim 1, additionally comprising electromagnetic induction projection means for inducing electromagnetic forces on an electric arc formed between the first connecting electrode and the mobile arc switching electrode tending either to project the arc to the arc chute or to make the arc switch to the second connecting electrode.

4. A device according to claim 1, wherein the driving means comprises electromagnetic induction repulsion means for inducing electromagnetic forces on the mobile arc switching electrode through which a current is flowing tending to drive the mobile arc switching electrode to the switching position.

5. A device according to claim 4, wherein the electromagnetic induction repulsion means comprises a magnetic driving circuit for channeling a magnetic flux generated by an electric current flowing between the first connecting pad and the first connecting electrode to the mobile arc switching electrode in the operating position, so that when an electric current flows from the first connecting pad to the mobile arc switching electrode, electromagnetic forces are induced in the mobile arc switching electrode, tending to drive the mobile arc switching electrode to the switching position.

6. A device according to claim 1, wherein the driving means comprises a mechanism equipped with a mobile means for operation between an between an operating position and a disconnection position, and a kinematic link between the means for operation and the mobile arc switching electrode for driving the mobile arc switching electrode to a disconnected position when the means for operation move from the operating position to the disconnection position.

7. A device according to claim 1, wherein the driving means comprises flexible return means for returning the mobile arc switching electrode to the operating position.

8. A device according to claim 1, wherein the driving means comprises an energy storage spring for discharging when driving the mobile arc switching electrode from the operating position to the switching position.

9. A device according to claim 1, wherein the electrical ignition means comprises a variable resistor.

10. A device according to claim 1, wherein one of said first and second connecting pads is for connection to an electric line, and the other of said connecting pads is for connection to earth.

11. A device for protecting electrical devices against voltage surges, comprising:
first and second electrical pads, one of which is electrically connected to an electrical line and the other electrically connected to ground,
a first electrode connected to said first electrical pad and shaped for directing an electric arc to an arc chute and comprising a fixed electrical contact,
a mobile arc switching electrode comprising a second contact for electrically contacting said first contact when said mobile arc switching electrode is in its closed position,
a means for driving said mobile arc switching electrode, electrically connected between said first electrode and said first electrical pad,
an electrical ignition means electrically connected in series between said mobile arc switching electrode and said second electrical pad, and having an ohmic resistance varying inversely with the voltage applied to the electrical ignition means, the ohmic resistance being relatively high when the voltage is lower than an ignition voltage, for activating said electrical ignition means, and decreasing when the voltage increases above the ignition voltage, and
a second electrode electrically connected to said second electrical pad and shaped for directing an electric arc to said arc chute,
wherein the electrical ignition means is for directing an electrical current to ground when a relatively small voltage surge occurs on the electrical line,
said means for driving the mobile arc switching electrode is for driving the mobile arc switching electrode when a relatively larger voltage surge occurs on the electrical line, such that said first and second contacts are separated and such electric arc bypasses said electrical ignition means, thereby protecting said electrical ignition means from such relatively larger voltage surge, and
said arc chute is for dissipating an electric arc between said first and second electrodes when a still larger voltage surge occurs on the electric line.

12. A device for protecting electrical devices against voltage surges according to claim 11, wherein the electrical ignition means comprises a spark arrestor and a variable resistor in series and the ignition voltage is the voltage at which current flows across the spark arrestor.

13. A device for protecting electrical devices against voltage surges, comprising:
first and second electrical pads, one of which is electrically connected to an electrical line and the other electrically connected to ground,
a first electrode connected to said first electrical pad and shaped for directing an electric arc to an arc chute and comprising a first electrical contact,
a mobile arc switching electrode comprising a second electrical contact,
a fixed stud between said first electrode and said mobile arc switching electrode for physically contacting said mobile arc switching electrode when said mobile arc switching electrode is in its closed position,
an ignition electrode between said fixed stud and said first electrode,
an ignition circuit electrically connected to said first electrical pad, said fixed stud, and said ignition electrode, for detecting a potential voltage difference between said first electrical pad and said fixed stud and for increasing a voltage at said ignition electrode when such potential voltage difference is relatively high, triggering an arc between said first electrode and said mobile arc electrode,
a means for driving said mobile arc switching electrode, electrically connected between said first electrode and said first electrical pad,
an electrical ignition means electrically connected in series between said mobile arc switching electrode and said second electrical pad, and having an ohmic resistance varying inversely with the voltage applied to the electrical ignition means, and
a second electrode electrically connected to said second electrical pad and shaped for directing an electric arc to said arc chute,
wherein the electrical ignition means is for directing an electrical current to ground when a relatively small voltage surge occurs on the electrical line,
said means for driving the mobile arc switching electrode is for driving the mobile arc switching electrode when a relatively larger voltage surge occurs on the electrical line, such that said second contact is separated from said fixed stud and such electric arc bypasses said electrical ignition means, thereby protecting said electrical ignition means from such relatively larger voltage surge, and
said arc chute is for dissipating an electric arc between said first and second electrodes when a still larger voltage surge occurs on the electric line.

14. A device for protecting electrical devices against voltage surges, comprising:
first and second electrical pads, one of which is connected to an electrical line and the other connected to ground,
a first electrode connected to said first electrical pad and shaped for directing an electric arc to an arc chute and comprising a first electrical contact,
a mobile arc switching electrode comprising a second electrical contact,
a fixed stud between said first electrode and said mobile arc switching electrode for physically contacting said mobile arc switching electrode when said mobile arc switching electrode is in its closed position,
an ignition electrode between said fixed stud and said first electrode, and
an ignition circuit electrically connected to said first electrical pad, said fixed stud, and said ignition electrode, for detecting a potential voltage difference between said first electrical pad and said fixed stud and for increasing a voltage at said ignition electrode when such voltage difference is relatively high, triggering an arc between said first electrode and mobile arc electrode,
a means for driving said mobile arc switching electrode, electrically connected between said first electrode and said first electrical pad,
an electrical ignition means electrically connected in series between said first electrode and said fixed stud, and having an ohmic resistance varying inversely with the voltage applied to the electrical ignition means, and a second electrode electrically connected to said second electrical pad and shaped for directing an electric arc to said arc chute, wherein the electrical ignition means is for directing an electrical current to ground via said mobile arc switching electrode and said second electrical pad when a relatively small voltage surge occurs on the electrical line, said means for driving the mobile arc switching electrode is for driving the mobile arc switching electrode when a relatively larger voltage surge occurs on the electrical line, such that said second contact is separated from said fixed stud and such electric arc bypasses said electrical ignition means, thereby protecting said electrical ignition means from such relatively larger voltage surge, and said arc chute is for dissipating an electric arc between said first and second electrodes when a still larger voltage surge occurs on the electric line.

* * * * *